United States Patent [19]

Fujikawa et al.

[11] Patent Number: 4,917,201
[45] Date of Patent: Apr. 17, 1990

[54] MOTOR VEHICLE

[75] Inventors: Tetsuzo Fujikawa, Kobe; Shinichi Tamba, Kakogawa, both of Japan

[73] Assignee: Kawasaki Jukogyo Kabushiki Kaisha, Japan

[21] Appl. No.: 109,523

[22] Filed: Oct. 19, 1987

Related U.S. Application Data

[62] Division of Ser. No. 808,636, Dec. 13, 1985.

[30] Foreign Application Priority Data

May 20, 1985 [JP] Japan .............................. 60-108914
May 24, 1985 [JP] Japan .............................. 60-112397

[51] Int. Cl.⁴ .............................................. B60K 11/00
[52] U.S. Cl. .................................. 180/68.2; 180/68.3; 180/68.4; 123/41.57

[58] Field of Search ..................... 180/68.1, 68.2, 68.3, 180/68.4, 68.6; 181/204, 205; 123/41.6, 41.7, 41.57

[56] References Cited

U.S. PATENT DOCUMENTS

| | | | |
|---|---|---|---|
| 4,173,995 | 11/1979 | Beck | 180/68.1 |
| 4,203,407 | 5/1980 | Fachbach et al. | 123/41.7 |
| 4,371,047 | 2/1983 | Hale et al. | 180/68.1 |
| 4,382,481 | 5/1983 | Moore | 180/68.1 |
| 4,598,786 | 7/1986 | Kirchweger | 180/68.1 |

*Primary Examiner*—Charles A. Marmor
*Assistant Examiner*—Richard Camby
*Attorney, Agent, or Firm*—Leydig, Voit & Mayer

[57] ABSTRACT

A motor vehicle having an air exhaust duct interposed between a radiator and an engine, the air exhaust duct being operative to guide cooling air that has cooled the radiator and became warm to flow in a direction in which the cooling air flows away from the engine without coming into contact therewith.

27 Claims, 2 Drawing Sheets

FORWARD

MOTOR VEHICLE

CROSS REFERENCE

This application is a divisional application of Ser. No. 808,636 filed on Dec. 13, 1985 for "Motor Vehicle".

BACKGROUND OF THE INVENTION

The present invention relates to a motor vehicle having a cooling device for a liquid-cooled engine in which a radiator is disposed in the vicinity of the engine and a radiator cooling fan is provided between the radiator and the engine, and is mainly concerned with a cooling device for a liquid-cooled engine to be installed on a motor vehicle having a narrow engine room enclosure or compartment such as a tractor or the like.

In a motor vehicle such as a tractor and the like, a radiator is, in general, disposed in front of an engine room, and an engine is disposed in the rear. However, the following problems occur due to the facts that it is not possible to expect a sufficient amount of cooling air resulting from running of the vehicle, that a sufficient space cannot be secured in the engine room, and that ventilation within the engine room is not sufficient:

a. The warm cooling air after having passed through the radiator raises the temperature within the engine room, to frequently cause heat troubles such as percolation, vapor-lock and the like, particularly in a fuel system; and b. The cooling air after having passed through the radiator is at a temperature higher than the environmental temperature by about 30 degrees. Therefore, if the warm air stays in the vicinity of the engine, heat radiation from the engine surface does not take place sufficiently. This increases a load on the cooling function of the radiator. Thus, a radiator becomes necessary which has a higher cooling performance.

SUMMARY OF THE INVENTION

In order to solve the above-described problems, the present invention is directed to a cooling device for a liquid cooled engine for working machines in which a radiator is disposed in the vicinity of the engine and a radiator cooling fan is provided between the radiator and the engine, wherein an air exhaust duct is provided between the radiator and the engine, for guiding cooling air after having passed through the radiator, to a location remote from the engine without coming into contact with the engine, to discharge the cooling air.

Further, according to another aspect of the invention, in addition to the above-described construction, in order to prevent leakage of the cooling air and reduce the number of component parts to be attached, the duct is split into two members, such as upper and lower, front and rear, or right and left duct members, and a fan shroud is formed integrally with the duct member or members.

DESCRIPTION OF THE PREFERRED EMBODIMENTS

Figure 1:
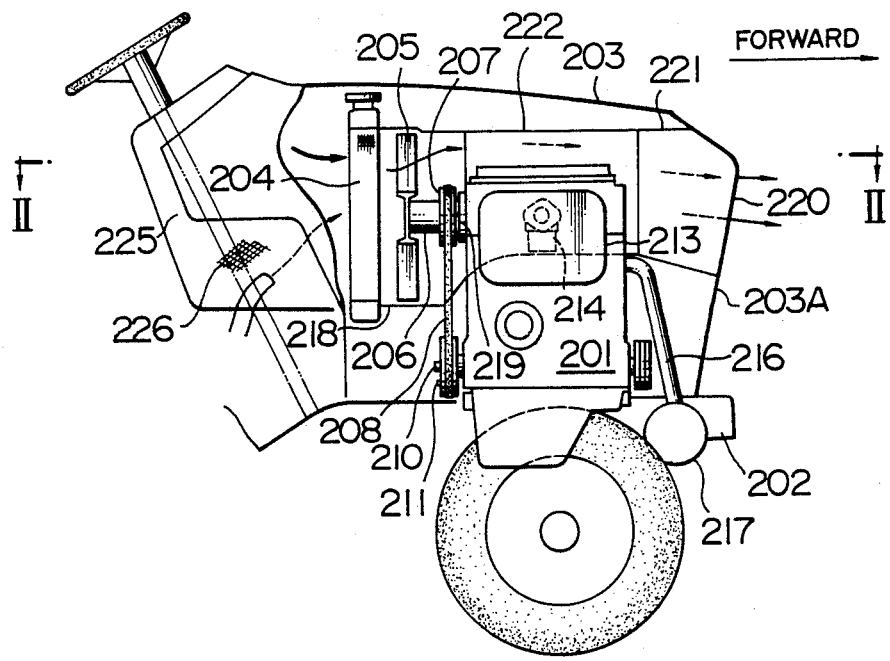
FIG. 1 is a side view, with certain parts omitted, of the essential portions of a tow motor comprising one embodiment of the invention.
Figure 2:
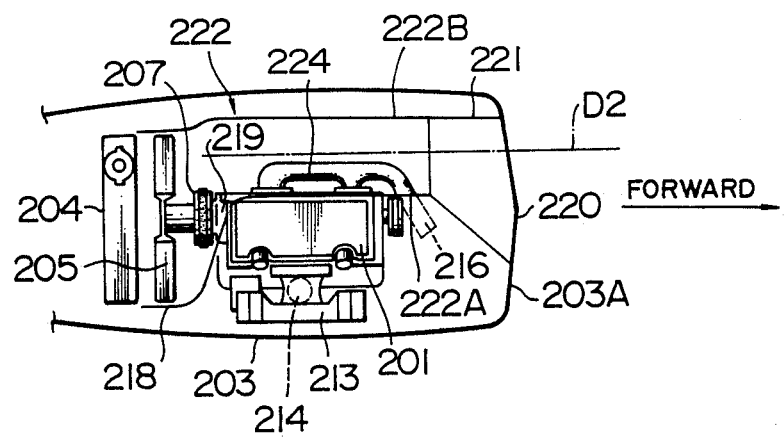
FIG. 2 is a sectional view taken along the lines II—II in FIG. 1.

FIGS. 1 and 2 show a tow motor mounting a liquid-cooled engine of the horizontal type comprising an embodiment of the invention. As shown, the engine 201 secured to a front axle bracket 202 is located in a spaced defined by a bonnet 203. A radiator 204 is located rearwardly of the engine 201 and supported by a bracket and a rubber member, not shown, secured to the engine 201. Interposed between the radiator 204 and the engine 201 is a fan 205 for cooling the radiator 204, which fan is supported by an extension bracket 206 secured to a fan pulley 207 which is connected to a pump shaft of a water pump 219 for rotation at the rear of the engine 201. A fan belt 208 is trained over the fan pulley 207 and a drive pulley 211 located below the fan pulley 207 and secured to the rear end portion of a crankshaft 210 which is supported by the engine 201 in a manner to be oriented horizontally and lengthwise of the vehicle.

Located at the right side of the engine 201 is an air cleaner 213 which is connected to the right side of the engine 201 via carburetor 214. An exhaust pipe 216 is located forwardly of the engine 201 and extends downwardly to be connected to a muffler 217 located below a front wall 203A of the bonnet 203. Located at the rear of the bonnet 203 is a dashboard 225 which is formed with cooling air inlet apertures 226 at both sides thereof to introduce cooling air currents therethrough into a space defined by the bonnet 203. A fan shroud 218 surrounding the fan 205 which cools the radiator 204 is located in front of the radiator 204 and has at its forward end portion an air current exhaust duct 222 which is formed of synthetic resinous material integrally with the shroud 218. In FIG. 1, the rear end portion of the duct 222 is shown in cross section.

Referring to FIG. 2, the duct 222 extends from the rear of the engine 201 to the left side of the engine 201 by passing same, and further extends forwardly to be connected to a duct portion 221 of the front wall 203A of the bonnet 203. The duct portion 221 is maintained at its forward end portion in communication with the atmosphere via exhaust apertures 220 formed at the front wall 201A of the bonnet 203. An exhaust manifold 224 at the left side of the engine 201 extends into the duct 222.

The duct 222 and fan shroud 218 are each split into two portions at a vertical plane $D_2$ which extends length-wise of the vehicle. A right duct portion 222A is resiliently supported by a bracket and a member formed of resilient material, such as rubber, secured to the engine 201, and a left duct portion 222B is bolted in a plurality of positions at its outer periphery to the outer periphery of the right duct portion 222A. The exhaust manifold 224 is connected at its forward end to an exhaust pipe 216.

The water pump 219 extends through the duct 222 at its rear so that the pump shaft thereof is connected to the fan pulley 207.

During engine operation, currents of cooling air introduced into the space defined by the bonnet 203 through the cooling air inlet apertures 226 formed at the dashboard 225 located rearwardly of the radiator 204 first cool the radiator 204 and then flow into the duct 222 via the shroud 218 as the fan 205 is actuated. The air currents entering the duct 222 are guided thereby and flow therethrough, without coming into contact with the engine 201, so that they flow forwardly by bypassing the engine 201, to be released via the duct portion 221 and exhaust apertures 220 into the atmosphere forwardly of the tow motor.

Attention is directed to the fact that the cooling air currents that have cooled the radiator 204 and become warm do not stagnate in the vicinity of the engine 201 but cool the exhaust manifold 224 of elevated temperature while flowing through the duct 222.

Figure 3:
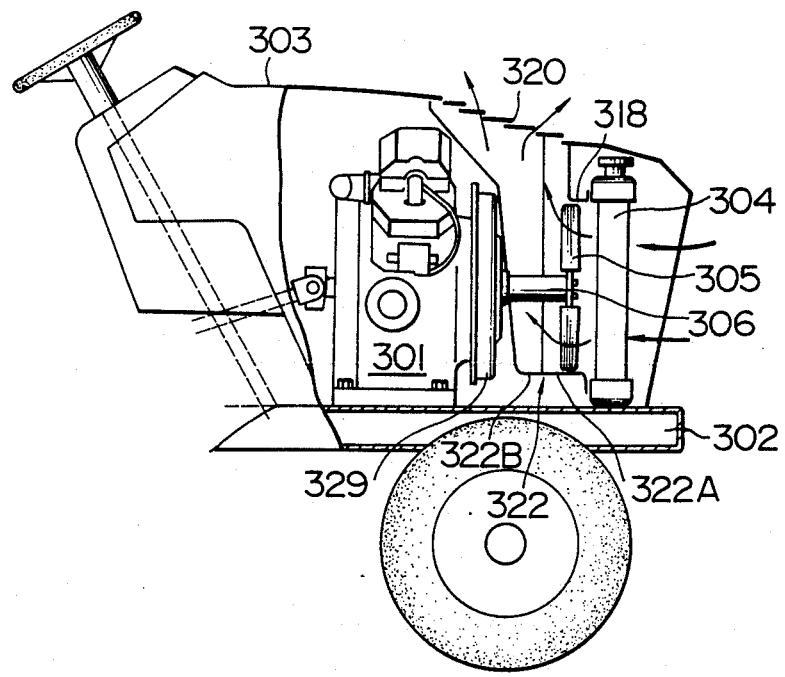
FIG. 3 is a side view, with certain parts omitted, of the essential portions of the tow motor comprising another embodiment of the invention.

FIG. 3 shows a tow motor mounting a liquid-cooled engine of the horizontal type which comprises still another embodiment of the invention. As shown, a radiator 304 is located in front of the engine 301, and a duct 322 is interposed between the front of the engine 301 and the radiator 304. The duct 322 is split into a forward duct portion 322A and a rearward duct portion 322B, and a fan shroud 318 is formed integrally with the forward duct portion 322A. The duct 322 has exhaust apertures 320 formed at the top wall of a bonnet 303 and face upwardly.

In FIG. 3, the reference numerals 302, 305 and 306 designate a front axle bracket, a cooling fan and an extension bracket, respectively.

Figure 4:
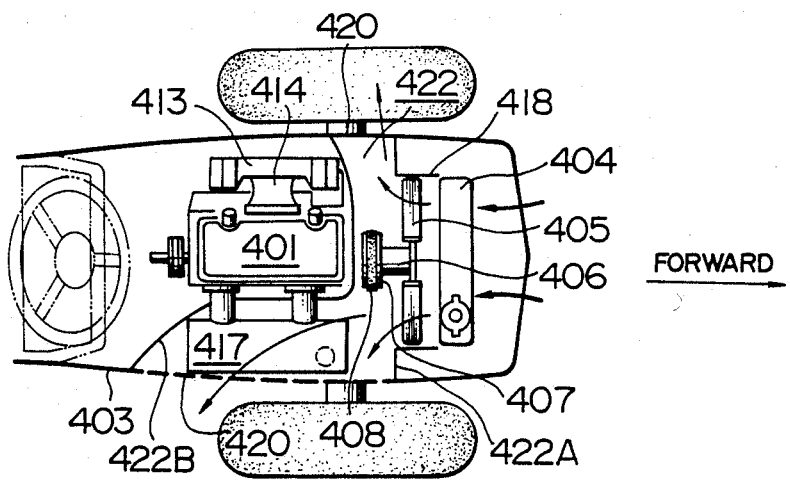
FIG. 4 is a plan view of the essential portions of the tow motor comprising a further embodiment of the invention.

FIG. 4 shows a tow motor mounting a water-cooled engine of the horizontal type which comprises a further embodiment of the invention. A radiator 404 is located in front of an engine body 401, and a duct 422 is interposed between the front of the engine body 401 and the radiator 404. The duct 422 is split into a forward duct portion 422A and a rearward duct portion 422B, and a fan shroud 418 is formed integrally with the forward duct portion 422A. Exhaust apertures 420 of the duct 422 are formed at the left and right side walls of a bonnet 403. An exhaust muffler 417 is located in the rearward duct portion 422B. The duct 422 may be split into a left duct portion and a right duct portion.

In FIG. 4, the reference numerals 405, 406, 407, 408, 413, 414 and 418 designate a cooling fan, an extension bracket, a pulley, an air cleaner, a carburetor and a shroud, respectively.

What is to be claimed is:

1. A motor vehicle comprising:
an engine,
a crankshaft driven by said engine,
a radiator located in the vicinity of said engine,
a cooling fan interposed between said engine and said radiator and operatively connected to said crankshaft,
an air exhaust duct interposed between said radiator and said engine, said air exhaust duct being operative to guide cooling air currents that have cooled the radiator and become warm to flow in a direction in which the cooling air currents flow away from the engine without coming into contact therewith, and
an engine exhaust muffler located within said air exhaust duct.

2. A motor vehicle as claimed in claim 1 comprising. A fan shroud formed integrally with the exhaust duct.

3. A motor vehicle as claimed in claim 1 wherein said air exhaust duct has outlet ports facing radially outwardly of a plane in which said fan rotates.

4. A motor vehicle as claimed in claim 2 wherein said air exhaust duct comprises a right duct portion operatively connected to a left duct portion.

5. An air duct system for a power unit including an engine having a crankshaft and a fan operatively connected to said crankshaft and a radiator, said air duct system interposed between the radiator and the engine and comprising an air exhaust duct for guiding warm air away from the engine without coming into contact therewith, the warm air emanating from the vicinity of the radiator, said air exhaust duct adapted to enclosure at least a portion of an engine exhaust manifold within said duct.

6. The air duct system duct according to claim 5, further including a fan shroud formed integrally with the air exhaust duct.

7. The air duct system according to claim 5 wherein said air exhaust duct has at least one outlet port facing radially outwardly of a horizontal plane.

8. The air duct system according to claim 5 wherein said air exhaust duct comprises a right duct portion operatively connected to a left duct portion.

9. The air duct system according to claim 5 further including an engine enclosure.

10. A motor vehicle as claimed in claim 1 wherein the air exhaust duct at least partially surrounds the engine.

11. The air duct system according to claim 5 wherein said air exhaust duct is adapted to at least partially surround the engine.

12. A motor vehicle as claimed in claim 1 wherein said air exhaust duct extends between a rear portion of the engine and a front wall of an engine enclosure.

13. A motor vehicle as claimed in claim 12 wherein said air exhaust duct communicates with apertures formed in said front wall of said engine enclosure.

14. A motor vehicle as claimed in claim 12 wherein said air exhaust duct is operatively connected to a duct portion associated with said front wall portion of said engine enclosure.

15. The air duct system according to claim 5 wherein said air exhaust duct is adapted to extend between a rear portion of the engine and a front wall of an engine enclosure.

16. The air duct system according to claim 15 wherein said air exhaust duct is adapted to communicate with apertures formed in the front wall of said engine enclosure.

17. The air duct system according to claim 15 wherein said air exhaust duct is operatively connected to a duct portion adapted to be associated with a front wall portion of an engine 18. A motor vehicle as claimed in claim 1 wherein at least a portion of an engine exhaust manifold is enclosed within said air exhaust duct.

19. A an air duct system for a power unit including an engine having a crankshaft and a fan operatively connected to said crankshaft and a radiator, said air duct system interposed between the radiator and the engine and comprising an air exhaust duct for guiding warm air away from the engine without coming in contact therewith, the warm air emanating from the vicinity of the radiator, said air exhaust duct adapted to enclosure an engine exhaust muffler within said duct.

20. The air duct system duct according to claim 19, further including a fan shroud formed integrally with the air exhaust duct.

21. The air duct system according to claim 19 wherein said air exhaust duct has at least one outlet port facing radially outwardly of a horizontal plane.

22. The air duct system according to claim 19 wherein said air exhaust duct comprises a right duct portion operatively connected to a left duct portion.

23. The air duct system according to claim 19 further including an engine enclosure.

24. The air duct system according to claim 19 wherein said air exhaust duct is adapted to at least partially surround the engine.

25. The air duct system according to claim 19 wherein said air exhaust duct is adapted to extend between a rear portion of the engine and a front wall of an engine enclosure.

26. The air duct system according to claim 25 wherein said air exhaust duct is adapted to communicate with apertures formed in the front wall of said engine enclosure.

27. The air duct system according to claim 25 wherein said air exhaust duct is operatively connected to a duct portion adapted to be associated with a front wall portion of an engine enclosure.

* * * * *

UNITED STATES PATENT AND TRADEMARK OFFICE
CERTIFICATE OF CORRECTION

PATENT NO. : 4,917,201
DATED : April 17, 1990
INVENTOR(S) : Fujikawa et al.

It is certified that error appears in the above-identified patent and that said Letters Patent is hereby corrected as shown below:

Column 3, line 61, after "comprising" delete ".";
          line 62, change "A" to --a--.

Column 4, line 8, change "enclosure" to --enclose--;
          line 49, after "engine" insert --enclosure.--;
          line 61, change "enclosure" to --enclose--.

Signed and Sealed this

Twenty-seventh Day of August, 1991

Attest:

HARRY F. MANBECK, JR.

*Attesting Officer*     *Commissioner of Patents and Trademarks*